(12) United States Patent
Fessel

(10) Patent No.: US 12,158,940 B2
(45) Date of Patent: Dec. 3, 2024

(54) METHOD AND SYSTEM FOR IMPROVED DATA CONTROL AND ACCESS

(71) Applicant: Cigent Technology, Inc., Fort Myers, FL (US)

(72) Inventor: Tony Edward Fessel, Fort Myers, FL (US)

(73) Assignee: CIGENT TECHNOLOGY, INC., Fort Myers, FL (US)

( * ) Notice: Subject to any disclaimer, the term of this patent is extended or adjusted under 35 U.S.C. 154(b) by 0 days.

(21) Appl. No.: 17/862,642

(22) Filed: Jul. 12, 2022

(65) Prior Publication Data

US 2022/0342977 A1 Oct. 27, 2022

Related U.S. Application Data

(60) Continuation of application No. 17/387,198, filed on Jul. 28, 2021, now Pat. No. 11,416,601, which is a continuation of application No. 16/550,426, filed on Aug. 26, 2019, now Pat. No. 11,106,779, which is a division of application No. 16/407,599, filed on May 9, 2019, now Pat. No. 10,437,983.

(Continued)

(51) Int. Cl.
| | |
|---|---|
| *G06F 3/06* | (2006.01) |
| *G06F 21/42* | (2013.01) |
| *G06F 21/62* | (2013.01) |
| *H04L 9/40* | (2022.01) |
| *H04W 12/63* | (2021.01) |

(52) U.S. Cl.
CPC ............ *G06F 21/42* (2013.01); *G06F 3/0614* (2013.01); *G06F 3/0659* (2013.01); *G06F 3/0673* (2013.01); *G06F 21/62* (2013.01); *G06F 21/6218* (2013.01); *H04L 63/1416* (2013.01); *H04W 12/63* (2021.01)

(58) Field of Classification Search
None
See application file for complete search history.

(56) References Cited

U.S. PATENT DOCUMENTS 6,266,773 B1 7/2001 Kisor et al.
6,320,800 B1 * 11/2001 Saito .................. G11C 8/06
365/230.01

(Continued)

FOREIGN PATENT DOCUMENTS

JP 2009512947 A 3/2009
JP 2010224840 A 10/2010

(Continued)

OTHER PUBLICATIONS

Wikipedia "Memory Hierarchy", accessed Aug. 8, 2020, pp. 1-4.

(Continued)

*Primary Examiner* — Elias Mamo
(74) *Attorney, Agent, or Firm* — Panitch Schwarze Belisario & Nadel LLP

(57) ABSTRACT

A method for backing up data includes: receiving, by a driver in a host controller of a data storage device, an indication of a threatening event identifying one or more data files in the data storage device; delaying, by the driver, the threatening event; and backing up, by the driver, the one or more data files in the data storage device, prior to allowing the threatening event.

20 Claims, 8 Drawing Sheets

Related U.S. Application Data

(60) Provisional application No. 62/764,777, filed on Aug. 16, 2018, provisional application No. 62/670,073, filed on May 11, 2018.

(56) References Cited

U.S. PATENT DOCUMENTS

| | | | |
|---|---|---|---|
| 6,507,895 B1 | 1/2003 | Wang et al. | |
| 7,392,358 B2 | 6/2008 | Chen et al. | |
| 7,461,216 B2 | 12/2008 | Sved et al. | |
| 7,634,629 B2 | 12/2009 | Nemiroff et al. | |
| 7,636,872 B2 | 12/2009 | Kramer et al. | |
| 7,693,889 B1 | 4/2010 | Armorer et al. | |
| 7,697,942 B2 | 4/2010 | Stevens | |
| 8,244,967 B2* | 8/2012 | Ishibashi | G11C 16/10 711/E12.001 |
| 8,312,064 B1 | 11/2012 | Gauvin | |
| 8,352,941 B1 | 1/2013 | Protopopov et al. | |
| 8,706,701 B1 | 4/2014 | Stefanov et al. | |
| 9,026,737 B1 | 5/2015 | Armangau et al. | |
| 9,411,513 B2* | 8/2016 | Lin | G06F 3/061 |
| 9,654,481 B1 | 5/2017 | Ho | |
| 10,231,128 B1 | 3/2019 | Ziraknejad et al. | |
| 10,509,769 B1 | 12/2019 | Shilane et al. | |
| 2002/0133586 A1 | 9/2002 | Shanklin et al. | |
| 2003/0028736 A1 | 2/2003 | Berkowitz et al. | |
| 2005/0144405 A1 | 6/2005 | Doran et al. | |
| 2005/0166085 A1 | 7/2005 | Thompson et al. | |
| 2006/0016877 A1 | 1/2006 | Bonalle et al. | |
| 2006/0098675 A1 | 5/2006 | Okuno | |
| 2006/0218320 A1 | 9/2006 | Avraham et al. | |
| 2006/0218439 A1 | 9/2006 | Carter-Schwendler et al. | |
| 2006/0242156 A1 | 10/2006 | Bish et al. | |
| 2006/0242159 A1 | 10/2006 | Bishop et al. | |
| 2007/0143555 A1 | 6/2007 | Nemiroff et al. | |
| 2007/0214332 A1 | 9/2007 | Sonoda et al. | |
| 2007/0220013 A1 | 9/2007 | Rabines et al. | |
| 2007/0274134 A1* | 11/2007 | Roohparvar | G11C 16/102 365/185.33 |
| 2008/0301256 A1 | 12/2008 | McWilliams et al. | |
| 2010/0030718 A1 | 2/2010 | Anderson et al. | |
| 2010/0161904 A1 | 6/2010 | Cypher et al. | |
| 2010/0169394 A1 | 7/2010 | Hahn | |
| 2011/0086615 A1 | 4/2011 | Golder | |
| 2012/0060207 A1 | 3/2012 | Mardikar et al. | |
| 2012/0066537 A1* | 3/2012 | Foster | G06F 1/12 713/400 |
| 2013/0311737 A1 | 11/2013 | Shaw et al. | |
| 2014/0082715 A1 | 3/2014 | Grajek et al. | |
| 2014/0082728 A1 | 3/2014 | Kim et al. | |
| 2015/0032840 A1 | 1/2015 | Daly, Jr. et al. | |
| 2015/0067349 A1 | 3/2015 | Werner et al. | |
| 2015/0121088 A1 | 4/2015 | Baryudin | |
| 2015/0172321 A1 | 6/2015 | Kirti et al. | |
| 2015/0281452 A1 | 10/2015 | Bohlin et al. | |
| 2015/0363785 A1 | 12/2015 | Perez et al. | |
| 2016/0099927 A1 | 4/2016 | Oz et al. | |
| 2016/0119339 A1 | 4/2016 | Bolotin et al. | |
| 2016/0182545 A1 | 6/2016 | Stolfo et al. | |
| 2016/0239232 A1 | 8/2016 | Chang et al. | |
| 2016/0283406 A1 | 9/2016 | Linga et al. | |
| 2017/0091438 A1 | 3/2017 | Raziel et al. | |
| 2018/0152356 A1 | 5/2018 | Dhariwal et al. | |
| 2018/0152434 A1 | 5/2018 | Panchapakesan et al. | |
| 2019/0188090 A1 | 6/2019 | Mukku et al. | |
| 2019/0258729 A1* | 8/2019 | Jeon | G06F 3/0679 |
| 2019/0377865 A1 | 12/2019 | Fessel | |
| 2020/0104060 A1* | 4/2020 | Choi | G06F 9/3004 |

FOREIGN PATENT DOCUMENTS

| | | |
|---|---|---|
| JP | 2013008121 A | 1/2013 |
| JP | 2013045292 A | 3/2013 |
| JP | 2017098658 A | 6/2017 |
| WO | 0137096 A1 | 5/2001 |
| WO | 2009096089 A1 | 8/2009 |
| WO | 2013154936 A1 | 10/2013 |

OTHER PUBLICATIONS

Notification of Transmittal of the International Search Report (forms PCT/ISA/220 and PCT/ISA/210) and the Written Opinion of the International Searching Authority (form PCT/ISA/237) issued on Dec. 30, 2019, by the International Application Division Korean Intellectual Property Office in corresponding International Application No. PCT/US2019/031472, 33 pages.

Weber "Working Draft Project American National T13/2161-D Standard, Information Technology—ATA/ATAPI Command Set—3 (ACS-3)", Oct. 28, 2013), 577 pages.

NVM Express Workgroup, "NVM Express Management Interface Revision 1.0", Nov. 17, 2015, 96 pages.

Third Party Observation (Communication pursuant to Rule 114(2) EPC) issued Oct. 26, 2021, by the European Patent Office in corresponding European Patent Application No. 19800107.5-1218. (3 pages).

Office Action (Notice of Reason for Refusal) issued Feb. 15, 2022 by the Japanese Patent Office In Corresponding Japanese Patent Application No. 2021-513372 and an English Translation of the Office Action 8 pages.

Anonymous: "Authentication—Wikipedia", (Jan. 17, 2018), XP055873007, Retrieved from the Internet: URL: https://en.wikipedia.org/w/index.php?title=Authentication&oldid=820933261 [retrieved on Dec. 14, 2021]. (13 pages).

Extended European Search Report issued Jan. 4, 2022, by the European Patent Office in corresponding European Patent Application No. 19800107.5-1218. (11 pages).

Office Action (Notice of Reasons for Refusal) issued Oct. 31, 2023, by the Japanese Patent Office in Corresponding Japanese Patent Application No. 2022-113269 and an English Summary of the Office Action (3 pages).

Official Decision of Refusal, dated Nov. 15, 2022, issued in corresponding JP Application No. 2021-513372, 3 pps.

* cited by examiner

400

500

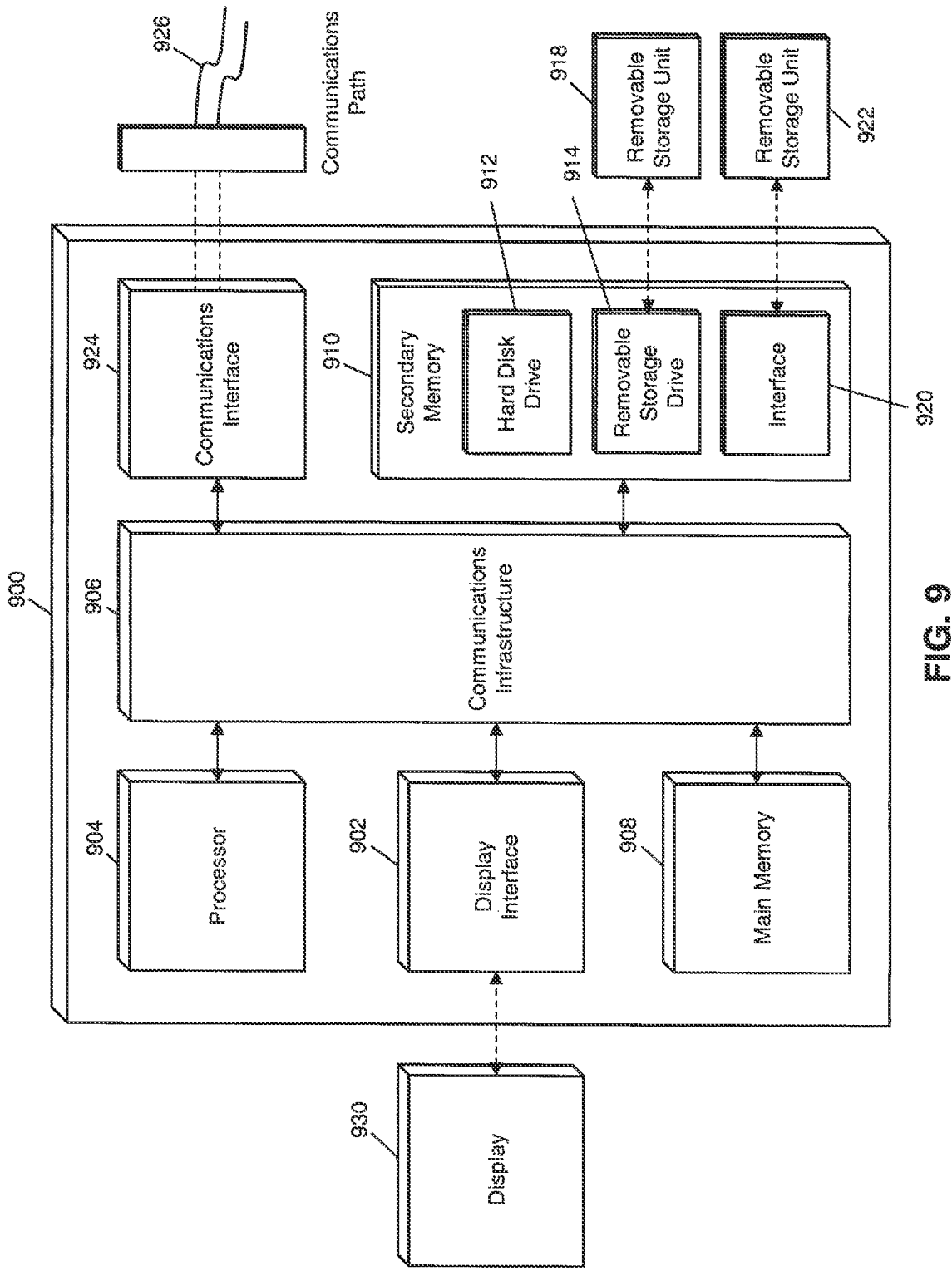

METHOD AND SYSTEM FOR IMPROVED DATA CONTROL AND ACCESS

FIELD

The present disclosure relates to the monitoring and control of data usage and access in a computing device, specifically the use of host controller drivers and software devices to monitor access to data at the data storage level and control thereof to prevent attack, misuse, and loss of important data.

BACKGROUND

Data in a computing device can be extremely important. Many times, the loss of data, whether through attack or even inadvertent deletion, can be extremely expensive and, in some cases, completely impossible to replace. Most solutions for data protection occur at the operating system level, where a software application is used to monitor for attacks that occur in the operating system or to back up data periodically so that it can be recovered should something happen. However, such applications are only useful against loss or attacks that occur on the operating system level that may be detected accordingly. For instance, an attack that comes in from a network device that attacks the operating system itself to prevent boot of the operating system cannot be prevented by an application program that only runs when the operating system is active, and may also be able to attack a data backup as much as it could the original data.

Thus, there is a need for a solution that enables for data monitoring and control that occurs at a level below the operating system.

SUMMARY

The present disclosure provides a description of systems and methods for data access monitoring and control that occurs at the data storage level, through implementation in a host controller of a data storage device and/or a separate hardware device that operates separately from the computing device's operating system. Such a device can monitor access to the individual data sectors and blocks of the data storage device to monitor usage thereof and access thereto, without regard for the content of the data itself. This type of implementation allows for data to be backed up, attacks to be stopped, and other actions taken even in cases where the operating system may be compromised, including the selection of a different operating system for execution that is not compromised even without the user being aware of the change. This results in a higher level of data protection, monitoring, and control that is unavailable at the operating system level.

A method for controlling data flow includes: identifying user permissions based on a user of an operating system; and controlling, by a host controller of a data storage device, retrieval of data based on the identified permissions.

A method for automatic restore of an operating system includes: storing a first set of operating system files in a first data sector of a data storage device; storing a second set of operating system files in a second data sector of the data storage device; receiving, by a host controller of the data storage device, a restore command; and responding, to a data retrieval request submitted to the driver in the host controller of the data storage device, with the second set of operating system files in a request for the first set of operating system files.

A method for backing up data includes: receiving, by a host controller of a data storage device, an indication of a threatening event identifying one or more data files in the data storage device; delaying, by the driver, the threatening event; and backing up, by the driver, the one or more data files in the data storage device, prior to allowing the threatening event.

A method for providing interconnected security in a computing network includes: connecting, by a computing network, a plurality of computing devices; establishing, by each of the plurality of computing devices, an alternate, secure communication channel with each of the other computing devices in the plurality of computing devices; detecting, by one of the plurality of computing devices, a threatening event; and transmitting, by the one of the plurality of computing devices, a notification of the detected threatening event to each of the other computing devices in the plurality of computing devices.

A method for detecting unusual system activity includes: logging, by a host controller of a data storage device, a plurality of actions performed by a user of a computing system over time; determining, by the host controller, a user fingerprint for the user comprising of a plurality of usage actions based on the logged plurality of actions; and detecting, by the host controller, unusual system activity based on a performed action that is not included in the user fingerprint.

A method for controlling data access includes: establishing, by a hardware device, a first communication channel with a host controller of a data storage device and a second communication channel with a separate device; and controlling, by the hardware device, data transmitted from the data storage device to the separate device using the first and second communication channels.

A method for controlling data access includes: detecting, by a host controller of a data storage device, compliance with one or more established rules; and controlling, by the host controller, access to data in the data storage device based on the detected compliance.

A method for monitoring data usage includes: detecting, at a file system level of a data storage device, an amount of data transferred from the data storage device to a host device.

A method for triggering data protection includes: detecting, by an input circuit interfaced with a storage platform controller, the presence or absence of a predetermined command; and performing, by the storage platform controller, a predetermined action as a result of the detection.

A method for tracking data storage access includes: tracking, by a host controller of a data storage device, access to one or more sectors of the data storage device.

A method for clearing unused flash memory includes: detecting, in a flash memory storage device, one or more inactive blocks of a plurality of data storage blocks; and performing one or more actions for data removal in the one or more inactive blocks.

A method for clearing unused flash memory includes: performing, in a flash memory storage device, a wear leveling process; and performing one or more actions for data removal of one or more blocks involved in the wear leveling process where old data is transferred from the one or more blocks without new data being transferred to the one or more blocks.

A method for controlling data access includes requiring, at a file system or sector/block level of a data storage device, two-factor authentication for access to one or more data files, wherein the two-factor authentication is required during times based on preset criteria.

A method for authentication using augmented reality includes using locational, positional, and object data to authenticate a user by checking image data captured by the user for presence of the user in the location at the position and viewing the specified object, where, in some cases, additional authentication information may be displayed at or on the object in an augmented reality display.

A method for user authentication via typing heuristics includes generating a key for a user based on a typing pattern determined from typing keystrokes, where a new key is generated when a user types, and comparison of the new key to a registered key is used for authentication of the user.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 9 is a block diagram illustrating a computer system architecture in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Data Access Monitoring and Control in a Computing System

Figure 1:
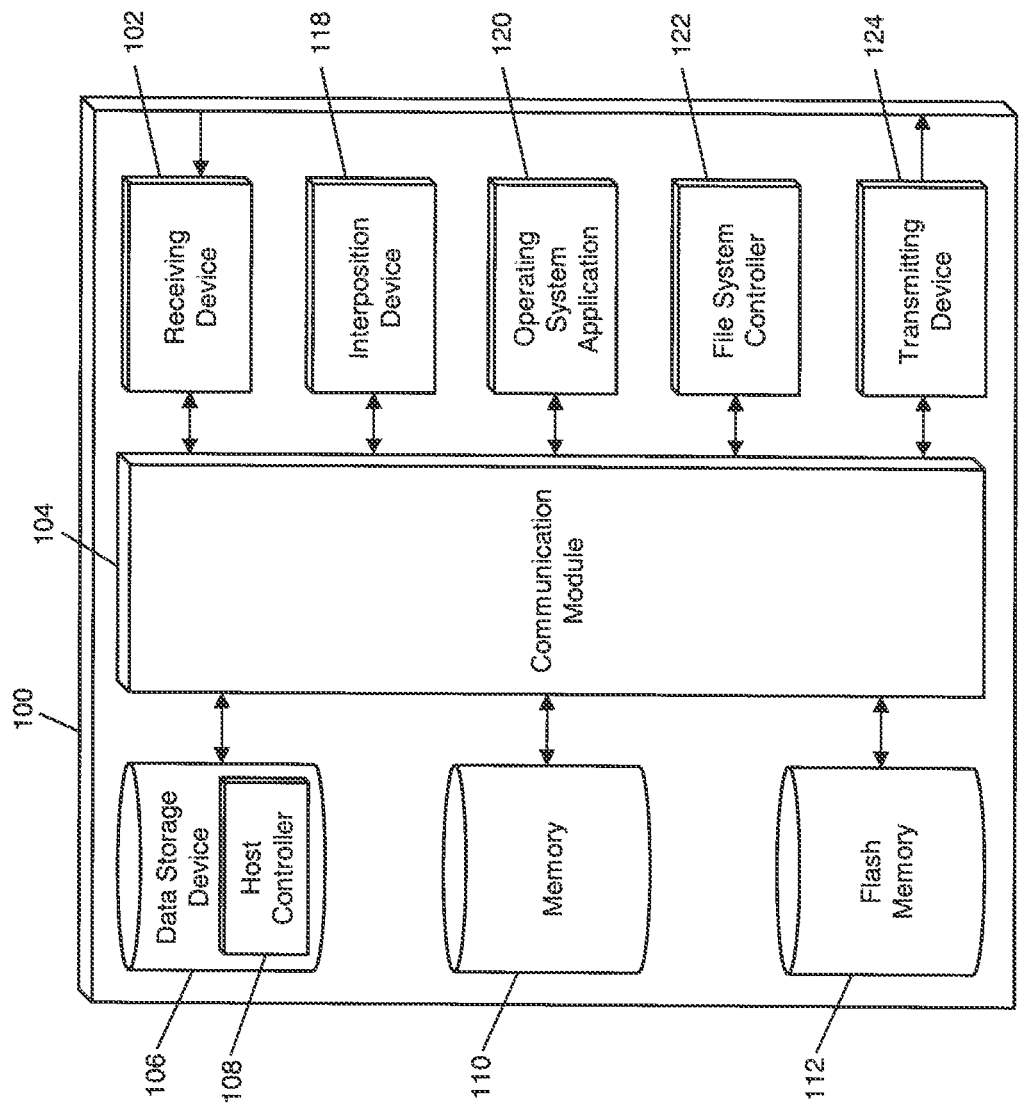
FIG. 1 is a block diagram illustrating a high level architecture of a computing device configured to monitor and control data access and usage via implementation involving a host controller of a data storage device in accordance with exemplary embodiments.

FIG. 1 illustrates an embodiment of a computing system 100. It will be apparent to persons having skill in the relevant art that the embodiment of the computing system 100 illustrated in FIG. 1 is provided as illustration only and may not be exhaustive to all possible configurations of the computing system 100 suitable for performing the functions as discussed herein. For example, the computer system 900 illustrated in FIG. 9 and discussed in more detail below may be a suitable configuration of the computing system 100.

The computing system 100 may be comprised of a plurality of modules, engines, devices, memories, and other components that are specially configured for the performing of the functions as discussed herein, including the monitoring of access to a data storage device 106 and use of the data stored therein. The data storage device 106 may be any type of device suitable for the storage of data, including a hard disk drive, solid state drive, compact disc, digital video disc, magnetic tape, etc. The data storage device 106 may include a host controller 108. The host controller 108 may be an application program that is implemented in hardware, software, or a combination thereof in the data storage device 106 that is configured to read and write data in the data storage device 106. The host controller may be configured to perform any functions related to access and modification of data stored in the data storage device 106, including the prevention of access to one or more data files, sectors, or blocks in the data storage device 106, the locking of sectors or blocks from modification, etc. As discussed herein, actions performed in the computing system 100 with respect to data stored in the data storage device 106 may be executed by or in conjunction with the host controller 108. For instance, the processes illustrated in FIGS. 3-8 may be executed by the host controller 108 or an application program (e.g., a driver) installed therein, by a separate hardware device (e.g., the interposition device 118, discussed in more detail below), or a combination thereof. In some cases, the data storage device 106 may include a memory for use by the host controller 108 to store data for use in performing functions and commands of the host controller 108, where such a memory may be separate from the data storage of the data storage device 106 used by the modules and engines of the computing system 100.

The host controller 108 may be configured to operate at the data storage level of the computing system 100. In other words, the computing system 100 may include an operating system (OS) application 120, which may be executed by a processing device of the computing system 100 to provide an interface to a user of the computing system 100 and a platform on which software application programs may run, where the host controller 108 may operate separately from the OS application 120. For instance, the OS application may, via a communication module 104, discussed in more detail below, access the data storage device 106 by talking to (e.g., exchanging communications with) the host controller 108 thereof. For example, the OS application 120 may be stored in the data storage device 106 as program code and may access its own files or files used by application programs executed on the OS by requesting corresponding data from the host controller 108.

In some embodiments, the computing system 100 may include a memory 110 in addition to the data storage device 106. The memory 110 may be a separate data storage device that may be read-only, random access, or other type of memory that may be used by the computing system 100 in the execution and use of the OS application 120. In some cases, the host controller 108 may be configured to operate as the host controller of the memory 110 as well, or may be otherwise configured to monitor access to and usage of data stored in the memory 110. The memory 110 may be configured to store data for use by the computing system 100 in performing functions discussed herein. The memory 110, as well as the data storage device 106, may be configured to store data using suitable data formatting methods and schema and may be any suitable type of memory. The memory 110 may include, for example, encryption keys and algorithms, communication protocols and standards, data formatting standards and protocols, program code for modules and application programs of the processing device, and other data that may be suitable for use by the computing system 100 in the performance of the functions disclosed herein as will be apparent to persons having skill in the relevant art. In some embodiments, the memory 110 may be comprised of or may otherwise include a relational database that utilizes structured query language for the storage, identification, modifying, updating, accessing, etc. of structured data sets stored therein.

In some embodiments, the computing system 100 may also include a flash memory 112. The flash memory 112 may be a solid state memory device that is separate from the data storage device 106 (e.g., and memory 110, if applicable) that may, in some cases, be removable from the computing system 100. Because the flash memory 112 may operate without the use of moving mechanical parts to implement the storage of data therein, the flash memory 112 may be subject to different and/or modified actions executed by the host controller 108 for the storage of and access to data thereof. In some embodiments, the host controller 108 of the data storage device 106 may also operate as the host controller 108 of the flash memory 112. In other embodiments, the flash memory 112 may have a separate host controller 108. As discussed herein, any of the functions performed by the host controller 108 may be performed by the host controller of the respective memories and data storage devices of the computing system 100.

The computing system 100 may also include a receiving device 102. The receiving device 102 may be configured to receive data over one or more networks via one or more network protocols. In some instances, the receiving device 102 may be configured to receive data from other computing systems that may be located on a local network of the computing system 100 or external to the computing system via one or more communication methods, such as radio frequency, local area networks, wireless area networks, cellular communication networks, Bluetooth, the Internet, etc. In some embodiments, the receiving device 102 may be comprised of multiple devices, such as different receiving devices for receiving data over different networks, such as a first receiving device for receiving data over a local area network and a second receiving device for receiving data via the Internet. The receiving device 102 may receive electronically transmitted data signals, where data may be superimposed or otherwise encoded on the data signal and decoded, parsed, read, or otherwise obtained via receipt of the data signal by the receiving device 102. In some instances, the receiving device 102 may include a parsing module for parsing the received data signal to obtain the data superimposed thereon. For example, the receiving device 102 may include a parser program configured to receive and transform the received data signal into usable input for the functions performed by the processing device to carry out the methods and systems described herein.

The computing system 100 may also include a transmitting device 124. The transmitting device 124 may be configured to transmit data over one or more networks via one or more network protocols. In some instances, the transmitting device 124 may be configured to transmit data to computing systems that may be located on a local network of the computing system 100 or external to the computing system via one or more communication methods, local area networks, wireless area networks, cellular communication, Bluetooth, radio frequency, the Internet, etc. In some embodiments, the transmitting device 124 may be comprised of multiple devices, such as different transmitting devices for transmitting data over different networks, such as a first transmitting device for transmitting data over a local area network and a second transmitting device for transmitting data via the Internet. The transmitting device 124 may electronically transmit data signals that have data superimposed that may be parsed by a receiving computing device. In some instances, the transmitting device 124 may include one or more modules for superimposing, encoding, or otherwise formatting data into data signals suitable for transmission.

The computing system 100 may also include a communication module 104. The communication module 104 may be configured to transmit data between modules, engines, databases, memories, and other components of the computing system 100 (e.g., which may also be referred to as "devices" or "host devices" of the computing system 100) for use in performing the functions discussed herein. The communication module 104 may be comprised of one or more communication types and utilize various communication methods for communications within a computing device. For example, the communication module 104 may be comprised of a bus, contact pin connectors, wires, etc. In some embodiments, the communication module 104 may also be configured to communicate between internal components of the computing system 100 and external components of the computing system 100, such as externally connected databases, display devices, input devices, etc. The computing system 100 may also include a processing device. The processing device may be configured to perform the functions of the computing system 100 discussed herein as will be apparent to persons having skill in the relevant art. In some embodiments, the processing device may include and/or be comprised of a plurality of engines and/or modules specially configured to perform one or more functions of the processing device. As used herein, the term "module" may be software or hardware particularly programmed to receive an input, perform one or more processes using the input, and provides an output. The input, output, and processes performed by various modules will be apparent to one skilled in the art based upon the present disclosure.

As discussed above, the computing system 100 may include an OS application 120. The OS application 120 may be system software that operates as a liaison between application programs that are executed using the OS application 120 as a platform and the data storage device 106 and other memory of the computing system. In some embodiments, the computing system 100 may have a plurality of OS applications 120 stored therein, which may each be stored in the data storage device 106 and/or other memory of the computing system 100. In such embodiments, a single OS application 120 may be executed at runtime of the computing system 100, which may be selected by a basic input/output system (BIOS) of the computing system 100. As discussed in more detail below, the host controller 108 may be configured to modify the selection of the OS application 120 for operation in the computing system 100 or otherwise modify the selected OS application 102 through data storage manipulation to prevent attack to the computing system 100 or otherwise ensure efficient operation.

The computing system 100 may also include a file system controller 122. The file system controller 122 may be a part of the OS application 120 and may be configured to provide an interface (e.g., as an application programming interface) through which a user of the computing system 102 or application programs of the OS application 102 access the file system of the data storage device 106 or other memory 110 of the computing system 102. In some cases, the file system controller 122 may communicate with (e.g., via the communication module 104) the host controller 108 of the respective data storage device 106 for the retrieval of or modification to data stored therein. For example, an application program that operates using the OS application 102 may interact with the file system controller 122 for access to data stored in the data storage device 106, where the file system controller 122 may provide instructions to the host controller 108 regarding data to read or write, where the host controller 108 may perform the necessary functions in the data storage device 106 to perform the requested operations.

In some embodiments, the computing system 100 may also include an interposition device 118. The interposition device 118 may be a hardware device that is separate from the data storage device 106 and other hardware components of the computing system 100 and configured to monitor data packets that are being transferred to and from the data storage device 106, such as may pass through the computing system 100 using the communication module 104. An implementation of the interposition device 118 is discussed in more detail below with respect to the hardware device 200 of FIG. 2. In some embodiments, the interposition device 118 may be implemented in the host controller 108 of the data storage device 106. In other embodiments, the interposition device 118 may communicate directly with the host controller 108 to monitor the data packets that are transmitted to and from the data storage device 106.

The computing system 100 may also include or be otherwise interfaced with one or more input devices. The input devices may be internal to the computing system 100 or external to the computing system 100 and connected thereto via one or more connections (e.g., wired or wireless) for the transmission of data to and/or from. The input devices may be configured to receive input from a user of the computing system 100, which may be provided to another module or engine of the computing system 100 (e.g., via the communication module 204) for processing accordingly. Input devices may include any type of input device suitable for receiving input for the performing of the functions discussed herein, such as a keyboard, mouse, click wheel, scroll wheel, microphone, touch screen, track pad, camera, optical imager, etc. The input device may be configured to, for example, receive keystroke information, optical images of a physical environment, and other data for use as discussed herein.

The computing system 100 may also include or be otherwise interfaced with a display device. The display device may be internal to the computing system 100 or external to the computing system 100 and connected thereto via one or more connections (e.g., wired or wireless) for the transmission of data to and/or from. The display device may be configured to display data to a user of the computing system 100. The display device may be any type of display suitable for displaying data as part of the functions discussed herein, such as a liquid crystal display, light emitting diode display, thin film transistor display, capacitive touch display, cathode ray tube display, light projection display, etc. In some instances, the computing system 100 may include multiple display devices. The display device may be configured to, for example, display authentication information, an augmented reality display of a physical area, a file system as part of an OS application 120, etc.

Interposition Device

Figure 2:
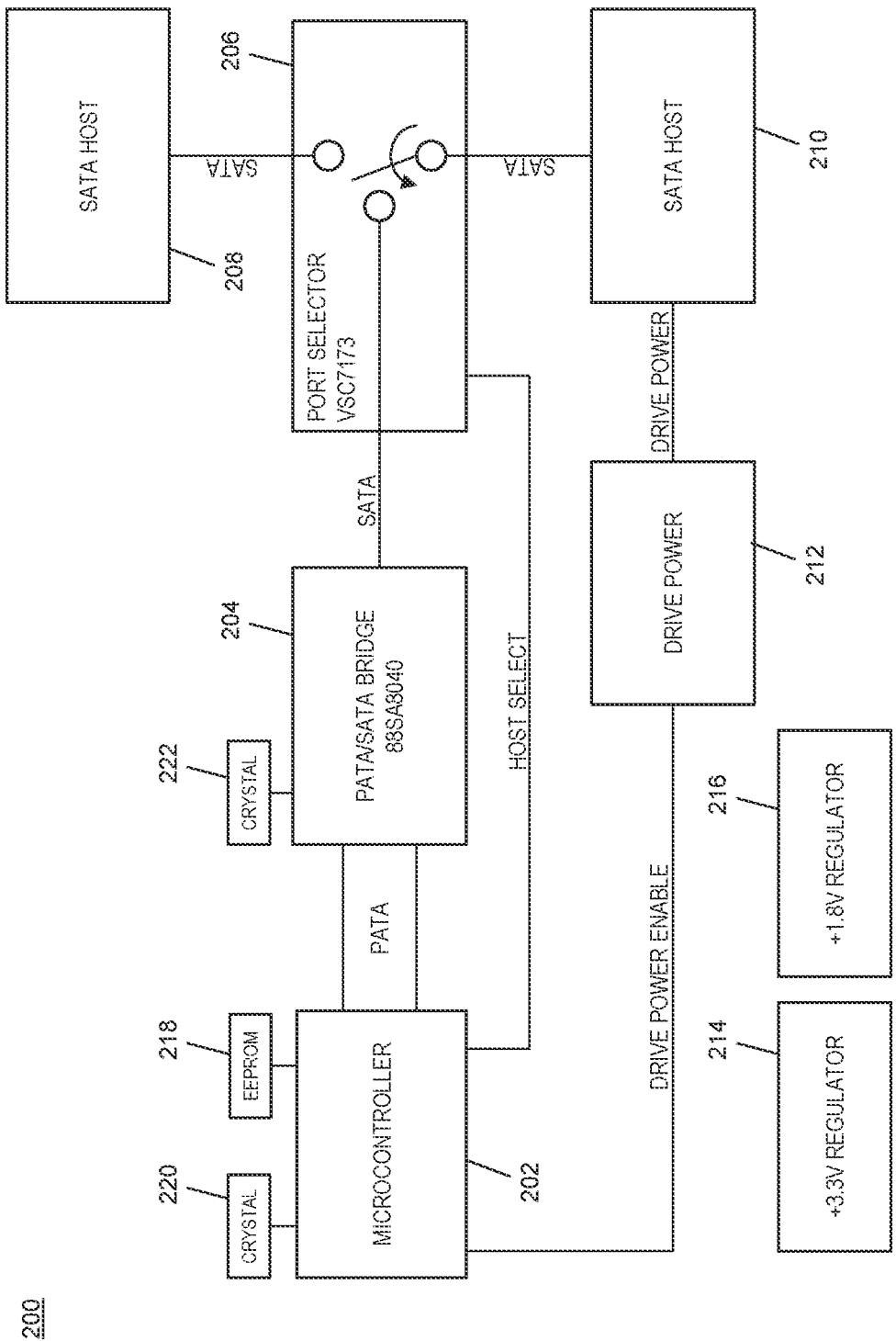
FIG. 2 is a block diagram illustrating a hardware device usable in the computing device of FIG. 1 for observing and controlling data packets that are traveling to and from a data storage device in accordance with exemplary embodiments.

FIG. 2 illustrates a hardware device 200 that may operate as the interposition device 118 in the computing system 100. It will be apparent to persons having skill in the relevant art that the embodiment of the hardware device 200 illustrated in FIG. 2 is provided as illustration only and may not be exhaustive to all possible configurations of the hardware device 200 suitable for performing the functions as discussed herein.

The hardware device 200 may include a microcontroller 202. The microcontroller 202 may be an integrated circuit that is configured to perform the functions of the interposition device 118 as discussed herein, such as being a programmed processing device that is configured to monitor data packets transmitted to and from the data storage device 106 in the computing system 100. The hardware device 200 may include a serial advanced technology (AT) attachment (SATA) drive 210, which may be configured to store data for use by the hardware device 200 in performing the functions related thereto. For instance, the SATA drive 210 may be configured to store program code for execution by the microcontroller 202, such as for the monitoring of the transfer of data packets. The SATA drive 210 may also be configured to store information regarding data packet monitoring, such as data logs for review by a user of the computing system 100, rules for the sending of alerts related to data transmissions, algorithms for identifying potential attacks in the computing system 100, etc.

The hardware device 200 may be configured to interface with a host 208 using SATA. The SATA host 208 may be, for instance, the communication module 104 or the data storage device 106, where the hardware device 200 may monitor the transfer of data packets to and from the data storage device 106 via the SATA host 208 or data received therefrom. The hardware device 200 may include a port selector 206, which may be configured to switch between the SATA drive 210 and SATA host 208 depending on the function of the hardware device 200 being performed, such as may be instructed by the microcontroller 202.

In some embodiments, the microcontroller 202 may be configured to communicate via a parallel AT attachment (PATA). In such embodiments, the hardware device 200 may include a PATA/SATA bridge 204, which may be configured to interface with the microcontroller 202 using PATA and the port selector using SATA, to enable communications to be exchanged between the microcontroller 202 and the SATA drive 210 and SATA host 208. The hardware device 200 may also include a drive power 212, which may be a component configured to provide electrical power to the SATA drive 210 for the operation thereof. The drive power 212 may be connected to the microcontroller 202 and receive instructions therefrom for operation, which may thereby result in the operation (or lack thereof) of the SATA drive 210. In some embodiments, the hardware device 200 may also include a +3.3 voltage regulator and/or a +1.8 voltage regulator 216 for the stabilization of voltage in the hardware device 200 depending on the needs of the hardware device 200, which may depend on the components included therein, components of the computing system 100, the interfacing of the hardware device 200 with the computing system 100, type of implementation of the hardware device 200, etc.

As discussed above, the hardware device 200 may operate as the interposition device 118 of the computing system 100, configured to inspect and relay command and data packets as they travel to and from the data storage device 106 and other memory 110 of the computing system 100. The hardware device 200 may be configured to observe, control, and route all inbound and outbound data storage destined for the data storage device 106. Such operations may be performed in conjunction with other operations of the computing system 100 discussed herein for the performance of functions associated therewith. For instance, the host controller 108, as discussed below, may be configured to monitor for potential attacks or other misuse of data stored in the data storage device 106 based on a routine of user actions related to data access, where the data access may be identified using the hardware device's observation of the inbound and outbound communications of the data storage device 106.

Example Host Controller & Interposition Device Functions

As discussed above, the host controller 108 of the computing system 100 and interposition device 118 may be configured to monitor the access to and usage of data stored in the data storage device 106 to prevent misuse of data, attempted attacks on the data, and to facilitate backup of the data to otherwise protect data stored in the computing system 100.

In one embodiment, the host controller 108 may be configured to control the data that flows from the data storage device 106 to a device requestor, such as the file system controller 122 that is requested data to be displayed to or otherwise used by a user of the computing system 102. In such an embodiment, the host controller 108 may be configured to understand requests that are submitted by the file system controller 122 and alter the data that is provided to the file system controller 122 such that a user's view of the data is modified by the host controller 108 without modification to the underlying data stored in the data storage device 106. For example, a user of the computing system 100 may perform an authentication process (e.g., login using the OS application 120), where each user of the computing system 100 may have a level of permissions associated therewith regarding the data they are able to view or otherwise access. The host controller 108 may, based on this level of permissions, alter the information provided to the file system controller 122 regarding data stored in the data storage device 106 such that the user is only able to see the data that they are permitted to. Data that the user is not permitted to view may continue to be stored in the data storage device 106 without modification by the host controller 108, but where the file system controller 122 does not present any information related thereto to the user. For instance, in the perspective of the user, the data will not exist, while being safely stored in the data storage device 106. In such instances, the data storage device 106 may thus protect data from deletion or misuse except by authorized parties.

The host controller 108 may also be configured to automatically select an OS application 120 for use in the booting of the computing system 100. For example, if the computing system 100 (e.g., via the host controller 108, interposition device 118, or other component) detects a potential issue with a default OS application 120, such as a failure in the operation of the OS application 120 or compromise of the OS application 120, the host controller 108 may be configured to automatically select a recovery OS application 120 for use in the computing system 100. In some cases, the recovery OS application 120 may be selected via manipulation of the underlying data storage. For instance, the host controller 108 may switch the data sectors and/or blocks that are used to store the default OS application 120 with those that store the recovery OS application 120 such that the computing system 100, when attempting normal operation, will execute the recovery OS application 120. In such an embodiment, the recovery OS application 120 will be automatically executed, which may prevent a compromised OS application 120 from making detrimental changes to the computing system 100 and provide the user with an opportunity to remove the compromise.

The ability to automatically select an OS application 120 may also be used by the host controller 108 to perform a restore or refresh of an OS application 120. For example, the host controller 108 may have a snapshot or saved state of an OS application 120 stored in a predetermined location in the data storage device 106. When a potential issue is identified with the OS application 120 (e.g., a detected attack, error in operation of the OS application 120) or if requested by the user of the computing system 100, the host controller 108 may automatically switch the OS application 120 with the saved state such that the saved OS application 120 (e.g., before the potential issue) is executed instead. In such a case, the host controller 108 may also overwrite the compromised OS application 120 after the switch during idle cycles of the computing system 102 to remove the compromise and further protect the computing system 100. In such implementations, the OS application 120 may be restored without knowledge or action of the user. In some embodiments, the restore may be performed using change logging. For instance, the host controller 108 may maintain a log of all operations executed with respect to the data storage device 106, where the restore operation may comprise reversal of all of the operations during a predetermined period of time (e.g., going back to a predefined restore point), such as modifying, moving, or replacing data stored in the data storage device 106 to return the data storage device 106 (e.g., and thus the OS application 120 stored therein) to its earlier state.

In some embodiments, the host controller 108 may be configured to automatically back up data stored in the data storage device 106. In such embodiments, the host controller 108 may be configured to monitor (e.g., directly or indirectly as informed by a separate component, such as the interposition device 118) for events occurring in the computing system 100 that may pose a threat to data. For example, unknown communications, requests for file deletion or modification, encryption or decryption of data, etc. may be identified by the host controller 108 as a potential negative event. When such an event is detected, the event may be paused or otherwise delayed while the host controller 108 backs up data. In some cases, the data being backed up may be predetermined. For example, there may be data (e.g., integral to the OS application 120, selected by a user, etc.) that is backed up regardless of the action being attempted. In other cases, the data being backed up may be data that is to be affected by the event. For example, if the event is the deletion of specific data blocks, those data blocks may be backed up. The host controller 108 may back up the data in a predetermined location in the data storage device 106, and may allow the event to occur once the backup has been completed. In such an embodiment, the data stored in the computing system 100 may remain protected regardless of the potential events that may occur. In some cases, multiple policies may be implemented, such as where the data that is backed up may vary based on the type of event or data that may be affected thereby, or where the actions taken may vary based on the type of event.

In some embodiments, the computing system 100 may be part of a network of other computing systems. In such embodiments, potential threatening or negative events may be detected by other computing systems in the network. In such cases, the host controller 108 may receive information regarding these potential threatening events from the other computing systems (e.g., detected using the functions discussed herein, such as by host controllers 108 or interposition devices 118 in the other computing systems) and may perform actions discussed herein based thereon. In some instances, the host controller 108 or other hardware component of the computing system 100 may establish an alternate, secure communication channel with a corresponding component in the other computing systems in the network. Such a channel may be separate from the communication channels of the network such that a threatening event that occurs in the network that may compromise the network will be unable to access or otherwise affect the alternate, secure channel. In some cases, the secure channel may operate on the network itself using techniques for the securing of communications using that channel (e.g., encryption). In other cases, a separate protocol and/or communication path may be used. In some cases, the other computing systems may be other computing systems 100 or may be any type of computing device that may establish a secure communication channel with the computing system 100 and detect threatening events, such as a motion detector, proximity door sensor, biometric scanner, set-top box, video game system, wearable computing device, etc.

In some embodiments, the host controller 108 may be configured to create sets of historical usage data related to users or other operation of the computing system 100 with respect to access to the data storage device 106. The historical usage data may be a log of actions that are performed related to the data storage device 106, such as the access to, retrieval of, modification to, or writing of data in the data storage device 106. The log may cover the span of a few seconds, the entire life of the data storage device 106, or any length of time in between. The log may cover any actions related to the data storage device 106 including the reading of data, writing of data, overwriting of data, modification of data, etc., and may specify the sectors and/or blocks that are affected and how they are affected. Using the log, the host controller 108 may develop a "fingerprint" or "snapshot" of typical usage characteristics for the computing system 100, which, in some cases, may be directly associated with users of the computing system 100 (e.g., each user may have their own fingerprints based on their own, individual actions). Such snapshots may be taken into account to determine a signature for each user or the computing system 100 as a whole to determine what actions are considered standard or "normal" when utilizing the data storage device 106. When an event is attempted that is outside of what is considered standard based on a user's signature, the event may be determined to be a threatening event. The host controller 108 may then perform any suitable actions when the threatening event is detected (e.g., automatic backing up of data, notification of other computing devices using the alternate, secure channel, encryption of data, altering of file system data, etc.). In some embodiments, the host controller 108 may be provided with signatures for known viruses, ransomware, or other undesirable agents, where the signature may be used to detect the existence of such an agent prior to negative actions being performed.

In some embodiments, the host controller 108 may be configured to control access to the data storage device 106 based on compliance with established rules. In some instances, the rules may involve the use of additional hardware components or other aspects independent of the computing system 100. For instance, the rules may require that the computing system 100 be located in a specific geographic area (e.g., based on the global positioning system), which may be identified by the host controller 108, a standard component of the computing system 100, or a separate hardware component that may be a part of the computing system 100 but operate independently of other components of the computing system 100 or otherwise inaccessible by the OS application 120. In another example, the host controller 108 may require the presence of a security dongle for access to the data storage device 106, and may also prevent the viewing of or usage of data based on credentials received from the security dongle (e.g., as discussed above with respect to altering the view of data presented by the file system controller 122). In another example, the rules may require a physical connection between the computing system 100 and another device. In some cases, failure to comply with an established rule may be identified by the host controller 108 as a threatening event and may perform requisite actions accordingly.

In some embodiments, the host controller 108 may be configured to monitor the amount of data transferred (e.g., read) from the data storage device 106. The host controller 108 may keep track of the amount of data read from the data storage device 106 and may perform actions based on the amount of data. For instance, limits on the amount of data read may be set, where access to the data may be prevented or otherwise restricted after a limit is reached, or where the reaching of a limit may be interpreted as a threatening event. The amount of data read from the data storage device 106 may also be considered as part of a user's fingerprint or signature. In some cases, the amount of data may be monitored with respect to periods of time, such as measuring how much data is accessed on an hourly, daily, weekly, monthly, etc. period of time. In some embodiments, the host controller 108 may monitor the amount of data transferred from specific sectors and/or blocks of the data storage device 106, where limits or rules may vary depending on the sector and/or block. For instance, there may be no limit on data read from blocks that are used to store OS application 120 program code or backed up data, but limits may be set on blocks that are used to store other data. In some cases, the host controller 108 may communicate with the file system controller 122 to receive additional information regarding accessed data, such as file type information, which may be used in the monitoring of accessed data. For example, limits may be placed on the amount of data read for media files (e.g., videos, images, music, etc.) but not for operating system files (e.g., dynamic-link libraries, system files, etc.).

In some embodiments, the computing system 100 may include an independent mechanical and/or electrical component that is used by the host controller 108 in the controlling of access to data stored in the data storage device 106. The independent component may be configurable such that a user of the computing system 100 may activate or deactivate usage of the independent component (e.g., among additional states, as applicable) where access to data in the data storage device 106 may be controlled by the host controller 108 based on the state of the independent component. For instance, a button may be included in the computing system 100 that is not interfaced with any other component apart from the host controller 108 where, when the button is pressed, access to a predetermined area of the data storage device 106 may be prevented. Any suitable type of mechanical and/or electrical component may be used, such as a button, switch, sensor, accelerometer, biometric scanner, optical imager, microphone, etc. In some instances, actions detected by the independent component may be interpreted by the host controller 108 as a threatening event. For instance, a biometric scanner may be used to control access to a portion of the data storage device 106 when a registered user's biometrics are read, but where a threatening event may be detected if an unauthorized user attempts authentication using the biometric scanner.

In some embodiments, the host controller 108 may be configured to perform additional functions when the data storage device 106 utilizes flash memory. Due to the nature of flash memory, data may sometimes be moved between blocks in the flash memory due to wear and degradation of the flash memory using wear leveling algorithms. Traditionally, blocks that experience wear have data moved therefrom to another blocks, but where the original block is not erased thus leaving the data subject to compromise. In some embodiments, the host controller 108 may be configured to perform full erases of these original blocks as part of the wear leveling processes executed for flash memory 112. The host controller 108 may also monitor for usage of blocks where blocks may be labeled as active or inactive based on the state of data stored therein and usage thereof in the flash memory 112. The host controller 108 may, at predetermined periods of time, perform full erases of data in inactive blocks to prevent compromise thereof and increase the life expectancy of the data blocks. Full erases may be accomplished via the use of retry writing, addressing smaller portions of data, overwriting of data with blank or indecipherable data, and other techniques used to ensure that data in an old or inactive block is cleared. In some instances, the host controller 108 may be configured to perform full erases of blocks in response to a command input by a user of the computing system 100, which may specify types of blocks (e.g., inactive blocks, worn blocks, etc.) or types of erase processes to use.

In some embodiments, the host controller 108 may be configured to use two-factor authentication to control access to data files stored in the data storage device 106. Two-factor authentication is a method of increasing the security of an authentication routine by requiring two different types of authentication relying on (i) what the user knows (e.g., a password) and (ii) what the user has (e.g., a dongle). In some cases, the user may be able to set one or both types of authentication, such as a biometric scanner, password, third party authentication service, security dongle, smart device, etc. In some instances, the user may select what data files two-factor authentication may be required to access. In some such cases, the two-factor authentication types used may vary for the controlled access. For example, the user may require two-factor authentication comprised of a password and security dongle for accessing all pictures stored in the data storage device 106, but may require two-factor authentication comprised of a fingerprint scan and a different security dongle for accessing files in a specific folder. Two-factor authentication can be set for specific files or folders, type of files, files or folders that meet specified search criteria, etc. In some cases, criteria may be set by the user for when two-factor authentication is required. For instance, the user may specify (e.g., for a particular set of two-factor authentication rules) that two-factor authentication is always required, that two-factor authentication is only required during a predetermined period of time (e.g., between 5 pm and 6 am), required for a specific timeframe (e.g., the next hour, next day, next week, etc.), or that two-factor authentication is only required when an attack is detected by the computing device 100 (e.g., directly or as notified by an external system or device) or when it is determined that the computing device 100 may be at risk for an attack (e.g., as identified, as discussed above). The user may have any combination of criteria, protection types, and two-factor authentication types, and may have multiple sets of protection active for a data storage device 106. In some cases, the data storage device may have a firmware modification thereto that restricts access to one or more sectors unless a user is able to complete the two-factor authentication process, such as to prevent access to data if the data storage device 106 is removed from the operating system (e.g., where the host controller 108 may be accessed or where the operating system may be used to manage the two-factor authentication instead of the host controller).

In some embodiments, the computing system 100 may be configured to utilize augmented reality as part of authentication processes, such as for one of the factors in the two-factor authentication discussed above. In such embodiments, a combination of positional, physical, and visual inputs may be used for authentication of a user in the computing system 100. Such inputs may include geolocation, local environment, local position, and object inputs. Geolocation inputs may include geographic coordinates (e.g., latitude and longitude), such as may be provided by use of the global positioning system. Local environment inputs may include broad visual cues that identify a user's immediate surroundings (e.g., in an office, in their home, in a specific office, on a baseball field, etc.). Local position inputs may include more specific environmental features related to the local environment to identify a position of the user in the local environment (e.g., corner of an office, center of a specific office, on first base of a baseball field, etc.). Object inputs may include data regarding a specific object or a feature thereof in a local environment that is viewable from the local position of the user (e.g., a mounted picture, a business card, a corner of a couch, the back of a wall safe, a sticker on a wall, etc.). A series of these inputs may be used as a set of authentication data for use in authenticating a user. For instance, a user may possess a camera (e.g., on a smart phone, wearable computing device, or other suitable device) that they use to capture image data and a geographic location where the image is captured, which is sent to the computing system 100. The computing system 100 can then identify if the user is in the registered geolocation using the geographic location and then determine, from the image data, if the user is in the correct local position in the local environment, and if the user is viewing the particular object. For instance, authentication may require that a user be in their home, in an office in their home, and looking at a specific sticker on a specific wall in their office.

In some cases, the use of augmented reality may be used as part of two-factor authentication. In such cases, the authentication of the user's viewing of the specified object in the specified environment at the specified geolocation may be combined with the supplying of additional data, such as a password or other information that may be supplied and authenticated in addition to the viewing of the object. In some instances, the viewing of the object may be used to reveal data to be used in the second factor of authentication. For example, the user may be using a camera or other optical imaging device to capture image data transmitted to the computing system 100 that also includes a display device to provide the user with a real-time display of the captured optical image, such as smart phone that is displaying what is being captured by the camera and transmitted to the computing system 100. If the user is viewing the correct object as determined by the computing system 100, the computing system 100 may transmit a password or other data to the device, which may display the data superimposed on the correct object using standard augmented reality techniques. For instance, in the above example, a list of passwords may be displayed on the specific sticker in the user's home office, where the user can then supply an appropriate password from the list as the second authentication factor. Thus, the only way a user can identify the correct password (e.g., which may be static or may be dynamic and generated by the computing system 100 prior to transmission for display to the user), is if they are in the correct environment at the correct location and viewing the correct object.

In some embodiments, typing heuristics may be used as an authentication factor in the computing system 100. The computing system 100 may include a keyboard as an input device interfaced with the computing system 100 to receive keystrokes entered by a user thereof, or the computing system 100 may otherwise receive keystroke information as part of a request for authentication of a user. Keystroke information may include at least keys that were pressed on the keyboard by the user, and may also include timestamp information regarding each keystroke and any other available information, such as typing pressure (e.g., used to depress each key), press and/or release times for each keystroke (e.g., how long it takes the user to press the key or to release the key once pressed), etc. The computing system 100 may receive the keystroke information and identify a typing pattern for the user (e.g., where the user may be identified through any suitable process). The typing pattern may be an evaluation of typing heuristics for the user, such as typing speed, keystroke speed, keystroke pressure, time between keystrokes (e.g., generally and/or specific keystrokes, such as from one particular letter to another), typing accuracy, etc. The typing pattern may be used to generate an authentication key for the user, where the authentication key may be a data value indicating the typing pattern, such as a value generated by hashing the typing heuristics. The authentication key can then be used to authenticate the user in later interactions with the computing system 100. For instance, in an example, typing heuristics may be captured any time a user of the computing system 100 (e.g., or other external device utilizing the computing system 100 for authentication) writes an e-mail. As the user types the content of the e-mail message, their keystrokes may be captured and the typing heuristics thereof evaluated by the computing system 100 prior to sending. The computing system 100 may generate a new key based on the typing pattern of the e-mail and may compare it to the authentication key generated for the user during a registration process. If the comparison succeeds, the user typing the e-mail is determined to be the registered user, and the e-mail may be sent successfully. If the comparison fails, an error message may be transmitted in place of the e-mail (e.g., or accompanying the e-mail, if suitable) indicating the failed authentication as the difference in typing pattern may indicate that a different person is purporting to be the registered user. In some instances, typing heuristics may be combined with the user fingerprint discussed above.

Example Host Controller Processes

Figure 3:
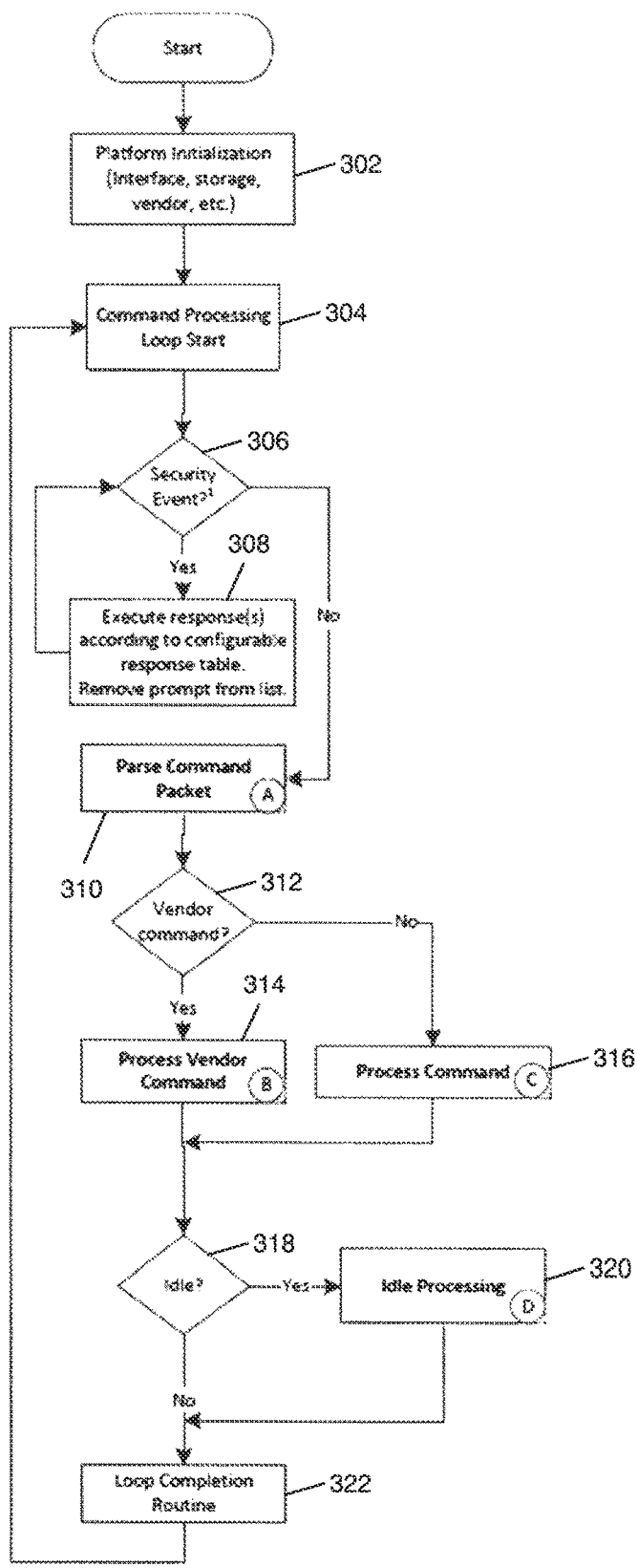
FIG. 3 is a flow diagram illustrating a process for execution by the main controller of a data storage device of the computing system of FIG. 1 in accordance with exemplary embodiments.
Figure 4:
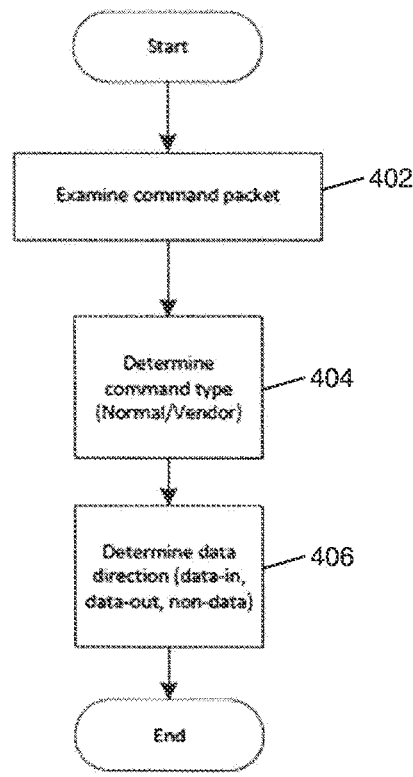
FIG. 4 is a flow diagram illustrating a process for the parsing of a command packet as part of the process illustrated in FIG. 3 in accordance with exemplary embodiments.
Figure 5:
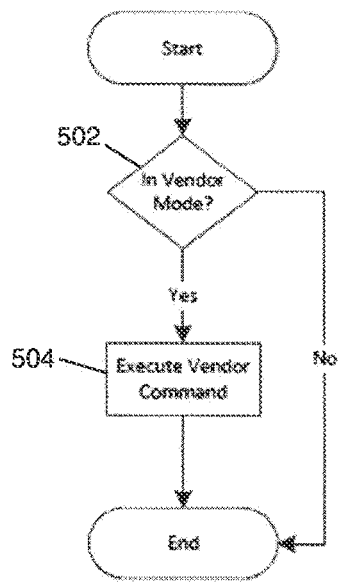
FIG. 5 is a flow diagram illustrating a process for the processing of a vendor command as part of the process illustrated in FIG. 3 in accordance with exemplary embodiments.

FIG. 3 illustrates a process 300 executed by the host controller 108 of the data storage device 106 regarding operation thereof in the computing system 100. It will be apparent to persons having ordinary skill in the art that the process 300 illustrated in FIG. 3 is an example and that additional and/or alternative processes may be used by the host controller 108 in operation thereof.

In step 302, the host controller 108 may initialize the platform, which may include the activation of an interface (e.g., an application programming interface for communication with the file system controller 122, an interposition device 118, etc.), the reading and logging of storage blocks and sectors, activation of any vendor features, establishing of secure channels with other components in the computing system 100 or network, etc. In step 304, a command processing loop may begin, which may comprise the standard processing of commands by the host controller 108 for operation of the data storage device 106.

In step 306, the host controller 108 may determine if a security event has occurred, such as a threatening event that may be detected by the host controller 108, interposition device 118, or other device that may communicate such data to the host controller 108. For instance, the threatening event may be the absence or presence of a command related to an independent component, the reaching of a data access limit, detection of a threatening event by another computing device communicated using the secure channel, etc. If a security event is detected, then, in step 308, the host controller 108 may execute an appropriate response according to a configurable response table. The configurable response table may include a list of responses to detected events, where the responses may include, for instance, the backing up of data, encryption of data, restoring of an OS application 120, notification of other computing systems 100, erasing of data, preventing of access to data, the return of alternate date (e.g., 0x00s, random data, etc.), etc. In cases where there is a prompt of events being tracked by the host controller 106, a prompt for the security event may be removed from the list once the appropriate response has been executed.

If an event occurs that is not a threatening event, then, in step 310, the event, also referred to herein as a command packet, is parsed. The parsing of a command packet may be performed using the process 400 illustrated in FIG. 4. In step 402, the command packet may be examined, where the command packet may be a command such as for the reading of data, modification of data, overwriting of data, moving of data, etc. In step 404, the host controller 108 may determine a command type for the command, such as based on the requestor of the command or action related thereto. For instance, the command may be a standard read command received from the file system controller 122 or may be a command issued from a vendor action as part of the data storage device 106. In step 406, the host controller 108 may determine which direction the data will flow as a result of the command, such as data going into the data storage device 106, data coming out of the data storage device 106, or where no data flows to/from the data storage device 106.

Once the command packet has been parsed, in step 312, the host controller 108 may determine (e.g., based on the parsing in step 404) if the command packet is a vendor command or otherwise. If the command packet is a vendor command, then, in step 314, the process 500 illustrated in FIG. 5 may be performed. In step 502, the host controller 108 may determine if the operation thereof is in a mode associated with the vendor corresponding to the vendor command. If not, the process 500 may end. Alternatively, the mode of the host controller 108 may be adjusted accordingly. If the host controller 108 is in a vendor mode, then, in step 504, the vendor command may be executed by the host controller 108 and the corresponding action performed.

Figure 6:
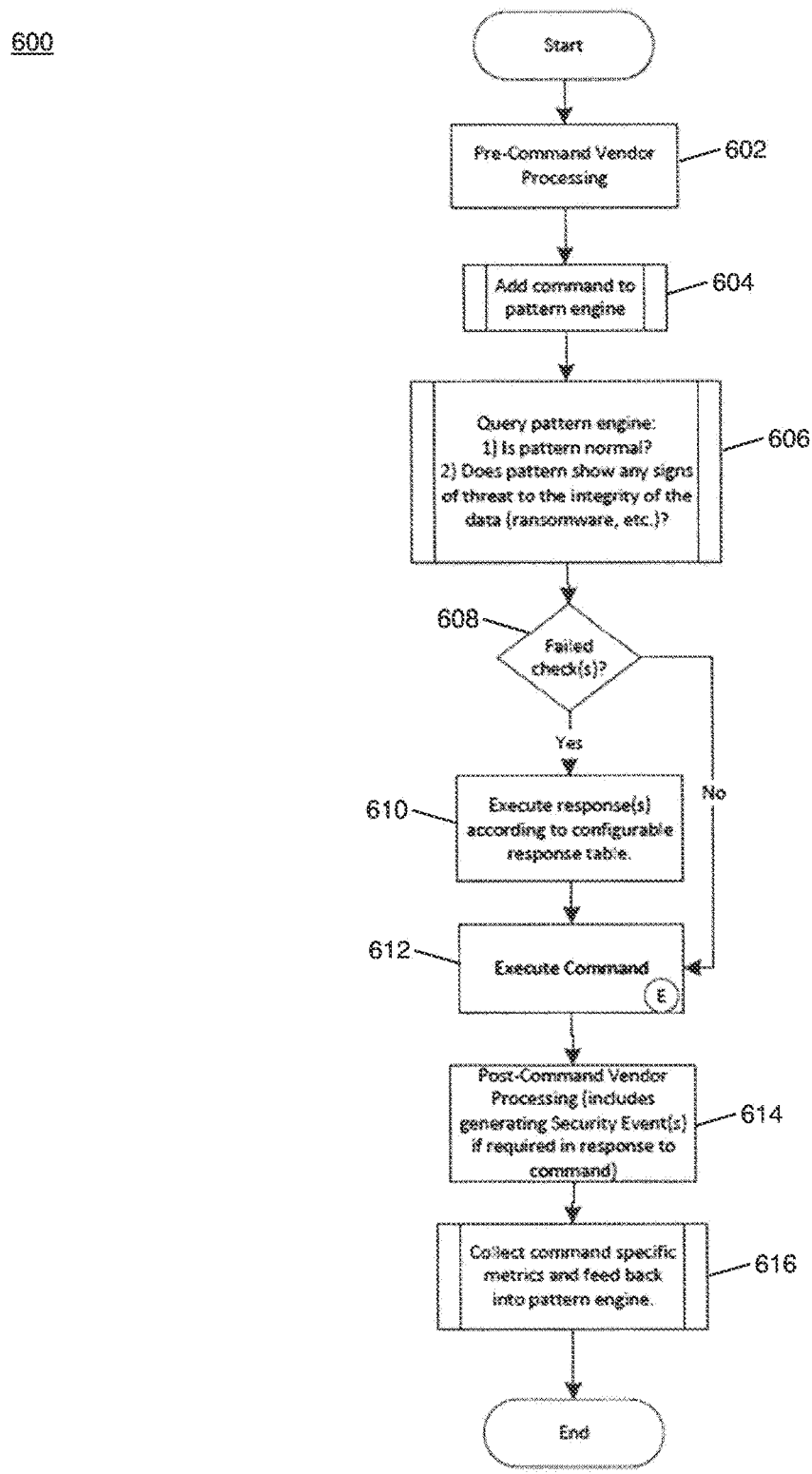
FIG. 6 is a flow diagram illustrating a process for the processing of a command as part of the main controller process illustrated in FIG. 3 in accordance with exemplary embodiments.

If, in step 312, the host controller 108 determines that the command packet is for a non-vendor command, then the host controller 108 may, in step 316, execute the process 600 illustrated in FIG. 6. In step 602, any processing related to vendors that must be performed before the command may be performed by the host controller 108. In step 604, the command to be performed (e.g., as indicated in the command packet) may be added to a pattern engine. In step 606, the pattern engine may be queried to determine if the pattern (e.g., of the command) is normal and if the pattern shows any signs of being a threatening event (e.g., based on signature, command to be performed, etc.). In step 608, the host controller 108 will determine if the check of the pattern engine has failed (e.g., a threatening or abnormal event was detected). If the check has failed, then, in step 610, an appropriate response as indicated in the configurable response table may be executed, such as described in step 308. In some cases, the process 600 may be completed once the response has been executed. In other cases, or if the check passed, then, in step 612, the command in the command packet may be executed (e.g., and the data read, written, overwritten, modified, etc.). Execution of the command may use the process 800, illustrated in FIG. 8 and discussed in more detail below.

In step 614, post-command processing may occur. In some cases, the post-command processing may include the identification of a threatening event, such as may occur as a result of the execution of the command. In cases where a threatening event has occurred, the threatening event may be fed back into the host controller 108 (e.g., at step 306) for execution of the appropriate response. In step 616, metrics regarding execution of the command may be captured and fed back into the pattern engine for use in future determinations made in later iterations of step 606.

Once the command has been processed, in step 318, the host controller 108 may determine if the process 300 is idle. The determination may be based on, for instance, a prompt list of received commands that are awaiting execution, where the host controller 108 may be idle if there are no command packets currently awaiting processing by the host controller 108. If the host controller 108 not idle, then, in step 322, the process 300 may return to step 304 to process the next command packet.

Figure 7:
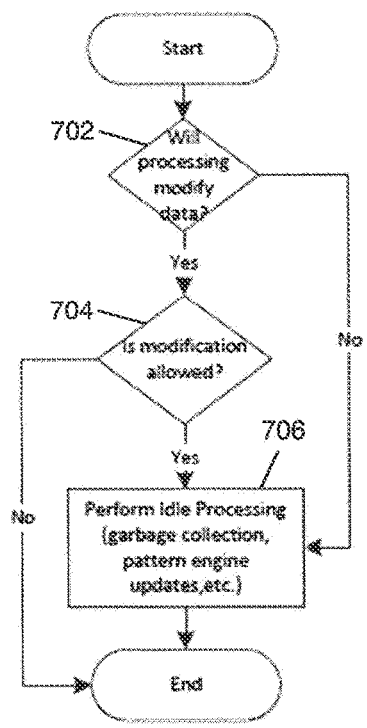
FIG. 7 is a flow diagram illustrating an idle process in the main controller process illustrated in FIG. 3 in accordance with exemplary embodiments.

If the host controller 108 is idle, then, in step 320, the host controller 108 may perform an idle process 700, such as illustrated in FIG. 7. In the idle process, in step 702, the host controller 108 may determine if any processing to be performed will modify data stored in the data storage device 106 (e.g., for clearing of old data, switching of data sectors, etc.). If modification will occur, then, in step 704, the host controller 108 may determine if such modification is allowed, such as based on the status of an independent component, compliance with applicable rules, etc. If modification is not allowed but is required for the command, then the process 700 may be completed without performing of the command. If modification is allowed, or modification is not required, then, in step 706, the host controller 108 may perform the idle processing command. Idle processing commands may include, for instance, the collection of garbage, clearing of old or inactive blocks, updating of the pattern engine, and other actions that will be apparent to persons having skill in the relevant art.

Figure 8:
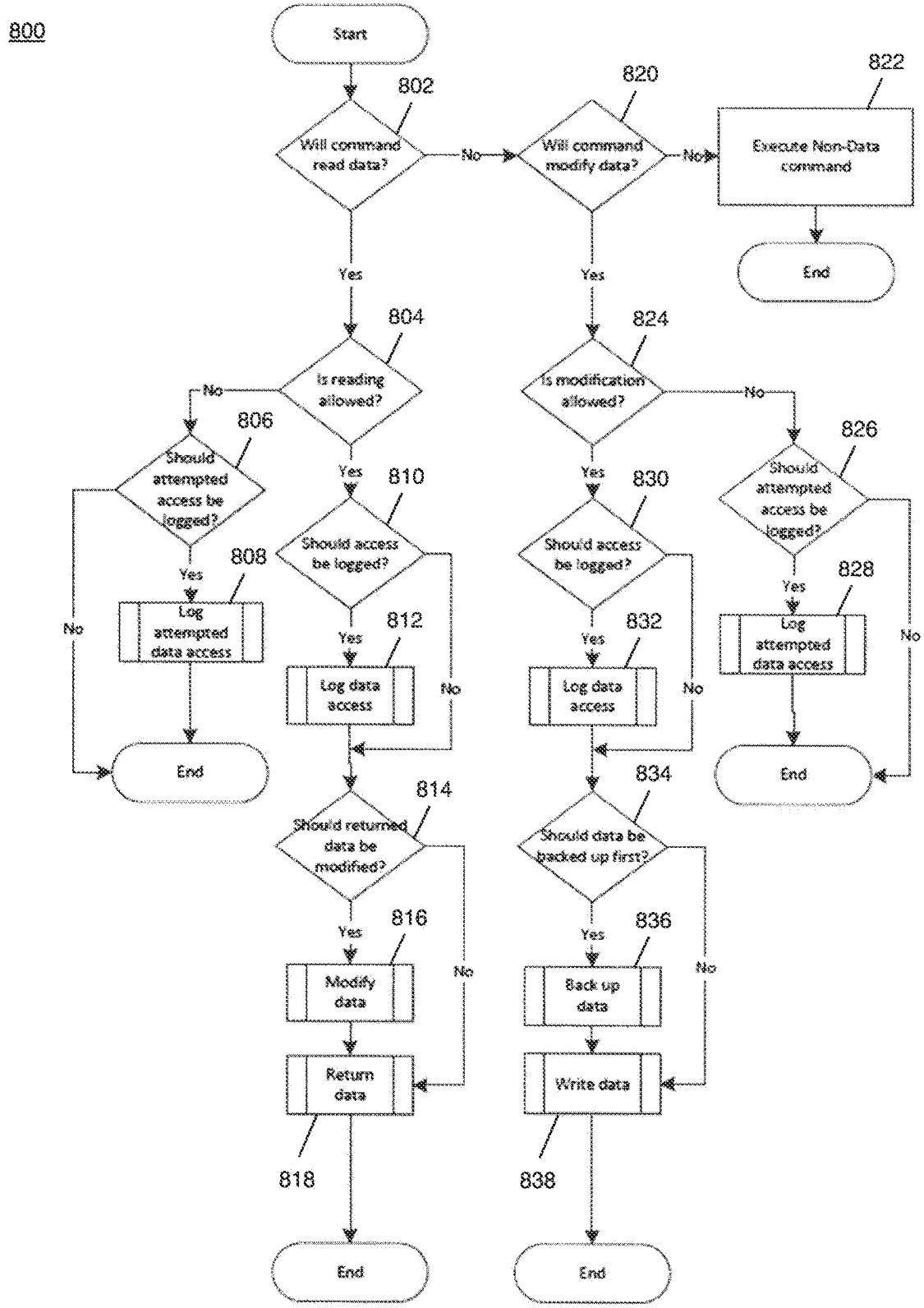
FIG. 8 is a flow diagram illustrating the execution of a command in the process illustrated in FIG. 6 in accordance with exemplary embodiments.

The execution of a command by the host controller 108 may utilize the process 800 illustrated in FIG. 8. In step 802, the host controller 108 will determine if the command is a read command (e.g., as determined in step 406). If the command is a read command, then, in step 804, the host controller 108 may determine if the reading of data is currently allowed, such as based on user restrictions, user permissions, independent component state, etc. If reading is not allowed, then, in step 806, the host controller 108 may determine if the attempted read access should be logged. Such a determination may be based on settings of the host controller 108, such as may be made by an operator of the computing system 100, manufacturer of the data storage device 106, the nature of the command, etc. If the access should not be logged, then the process 800 may be completed. If the access is to be logged, then, in step 808, the attempted read command may be logged in the host controller 108 (e.g., or another suitable component, such as in the SATA drive 210 of the interposition device 118).

If, in step 804, the host controller 108 determines that the reading is allowed, then, in step 810, the host controller 108 may determine if execution of the action is to be logged. If so, then, in step 812, the host controller 108 (e.g., or other suitable component) may log the execution of the command. In step 814, the host controller 108 may determine if the data being read should be modified prior to its return (e.g., as indicated in the command packet). If the data is to be modified, then, in step 816, the data may be modified accordingly. Once the data is modified, or if no modification is to occur, then, in step 818, the data may be returned to the file system controller 122 or other applicable component as indicated in the command packet and the process 800 completed.

If, in step 802, the host controller 108 determines that the command packet is not for the reading of data, then, in step 820, the host controller 108 may determine if the command packet is for the writing of data. If the command packet is for a command that does not read or write data, then, in step 322, the non-data command may be executed by the host controller 108. If the command involves the writing of data, then, in step 824, the host controller 108 may determine if modification to the corresponding data is allowed, such as discussed above. If the modification is not allowed, then, in steps 826 and 828, the host controller 108 may determine if the attempted modification should be logged and may proceed accordingly.

If modification is allowed, then, in step 830, the host controller 108 may determine if the modification should be logged and, if so, may log the modification to be performed, in step 832. In step 834, the host controller 108 may determine if the data to be modified should be backed up prior to modification. Such a determination may be based on the type of command, policies set forth in the host controller 108, detection of the command packet as a threatening event, etc. If back up is to occur, then, in step 836, the host controller 108 may back up the data to be modified, such as by copying the data to a predetermined block and/or sector in the data storage device 106. Once the backup has been completed, or if no backup is to occur, then, in step 838, the host controller 108 may perform the modification to the corresponding data block or sector to accomplish writing of data as indicated in the command packet.

Computer System Architecture

FIG. 9 illustrates a computer system 900 in which embodiments of the present disclosure, or portions thereof, may be implemented as computer-readable code. For example, the computing system 100 of FIG. 1 may be implemented in the computer system 900 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-8.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 918, a removable storage unit 922, and a hard disk installed in hard disk drive 912.

Various embodiments of the present disclosure are described in terms of this example computer system 900. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 904 may be a special purpose or a general purpose processor device specifically configured to perform the functions discussed herein. The processor device 904 may be connected to a communications infrastructure 906, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 900 may also include a main memory 908 (e.g., random access memory, read-only memory, etc.), and may also include a secondary memory 910. The secondary memory 910 may include the hard disk drive 912 and a removable storage drive 914, such as a floppy disk drive, a magnetic tape drive, an optical disk drive, a flash memory, etc.

The removable storage drive 914 may read from and/or write to the removable storage unit 918 in a well-known manner. The removable storage unit 918 may include a removable storage media that may be read by and written to by the removable storage drive 914. For example, if the removable storage drive 914 is a floppy disk drive or universal serial bus port, the removable storage unit 918 may be a floppy disk or portable flash drive, respectively. In one embodiment, the removable storage unit 918 may be non-transitory computer readable recording media.

In some embodiments, the secondary memory 910 may include alternative means for allowing computer programs or other instructions to be loaded into the computer system 900, for example, the removable storage unit 922 and an interface 920. Examples of such means may include a program cartridge and cartridge interface (e.g., as found in video game systems), a removable memory chip (e.g., EEPROM, PROM, etc.) and associated socket, and other removable storage units 922 and interfaces 920 as will be apparent to persons having skill in the relevant art.

Data stored in the computer system 900 (e.g., in the main memory 908 and/or the secondary memory 910) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 900 may also include a communications interface 924. The communications interface 924 may be configured to allow software and data to be transferred between the computer system 900 and external devices. Exemplary communications interfaces 924 may include a modem, a network interface (e.g., an Ethernet card), a communications port, a PCMCIA slot and card, etc. Software and data transferred via the communications interface 924 may be in the form of signals, which may be electronic, electromagnetic, optical, or other signals as will be apparent to persons having skill in the relevant art. The signals may travel via a communications path 926, which may be configured to carry the signals and may be implemented using wire, cable, fiber optics, a phone line, a cellular phone link, a radio frequency link, etc.

The computer system 900 may further include a display interface 902. The display interface 902 may be configured to allow data to be transferred between the computer system 900 and external display 930. Exemplary display interfaces 902 may include high-definition multimedia interface (HDMI), digital visual interface (DVI), video graphics array (VGA), etc. The display 930 may be any suitable type of display for displaying data transmitted via the display interface 902 of the computer system 900, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 908 and secondary memory 910, which may be memory semiconductors (e.g., DRAMs, etc.). These computer program products may be means for providing software to the computer system 900. Computer programs (e.g., computer control logic) may be stored in the main memory 908 and/or the secondary memory 910. Computer programs may also be received via the communications interface 924. Such computer programs, when executed, may enable computer system 900 to implement the present methods as discussed herein. In particular, the computer programs, when executed, may enable processor device 904 to implement the methods illustrated by FIGS. 3-8, as discussed herein. Accordingly, such computer programs may represent controllers of the computer system 900. Where the present disclosure is implemented using software, the software may be stored in a computer program product and loaded into the computer system 900 using the removable storage drive 914, interface 920, and hard disk drive 912, or communications interface 924.

The processor device 904 may comprise one or more modules or engines configured to perform the functions of the computer system 900. Each of the modules or engines may be implemented using hardware and, in some instances, may also utilize software, such as corresponding to program code and/or programs stored in the main memory 908 or secondary memory 910. In such instances, program code may be compiled by the processor device 904 (e.g., by a compiling module or engine) prior to execution by the hardware of the computer system 900. For example, the program code may be source code written in a programming language that is translated into a lower level language, such as assembly language or machine code, for execution by the processor device 904 and/or any additional hardware components of the computer system 900. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 900 to perform the functions disclosed herein. It will be apparent to persons having skill in the relevant art that such processes result in the computer system 900 being a specially configured computer system 900 uniquely programmed to perform the functions discussed above.

Techniques consistent with the present disclosure provide, among other features, systems and methods for the monitoring and control of data access. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for clearing unused flash memory, comprising:
storing, in a flash memory storage device in a computing system, data in a plurality of data storage blocks, wherein each data storage block is capable of storing one or more data items;
detecting, in a host controller of the flash memory storage device, one or more inactive blocks in the plurality of data storage blocks, the host controller operating separately from an operating system of the computing system; and
executing, by the host controller, one or more actions for data removal in the detected one or more inactive blocks.

2. The method of claim 1, wherein the one or more actions for data removal are executed at predetermined periods of time.

3. The method of claim 1, wherein the one or more actions for data removal are executed during idle cycles of the flash memory storage device.

4. The method of claim 1, wherein the one or more actions includes overwriting data in the one or more inactive blocks with indecipherable data.

5. The method of claim 1, wherein the one or more actions for data removal are executed upon receipt of a command input by a user of the computing system as received by a receiver of the host controller.

6. A method for clearing unused flash memory, comprising:
performing, in a flash memory storage device of a computing system, a wear leveling process;
identifying, by a host controller in the flash memory storage device, data stored in one or more blocks in the flash memory storage device where, as part of the wear leveling process, old data was transferred from the one or more blocks without new data being transferred to the one or more blocks, the host controller operating separately from an operating system of the computing system;
executing, by the host controller, one or more actions for data removal in the identified one or more blocks.

7. The method of claim 6, wherein the one or more actions for data removal are executed at predetermined periods of time.

8. The method of claim 6, wherein the one or more actions for data removal are executed during idle cycles of the flash memory storage device.

9. The method of claim 6, wherein the one or more actions includes overwriting data in identified one or more blocks with indecipherable data.

10. The method of claim 6, wherein the one or more actions for data removal are executed upon receipt of a command input by a user of the computing system as received by a receiver of the host controller.

11. A system for clearing unused flash memory, comprising:
a computing system including a flash memory storage device;
the flash memory storage device including a host controller and storing data in a plurality of data storage blocks, wherein each data storage block is capable of storing one or more data items, the host controller operating separately from an operating system of the computing system; and
the host controller configured to
detect one or more inactive blocks in the plurality of data storage blocks, and
execute one or more actions for data removal in the detected one or more inactive blocks.

12. The system of claim 11, wherein the one or more actions for data removal are executed at predetermined periods of time.

13. The system of claim 11, wherein the one or more actions for data removal are executed during idle cycles of the flash memory storage device.

14. The system of claim 11, wherein the one or more actions includes overwriting data in the one or more inactive blocks with indecipherable data.

15. The system of claim 11, wherein the one or more actions for data removal are executed upon receipt of a command input by a user of the computing system as received by a receiver of the host controller.

16. A system for clearing unused flash memory, comprising:
a computing system including a flash memory storage device;

the flash memory storage device including a host controller and performing a wear leveling process, the host controller operating separately from an operating system of the computing system; and the host controller configured to identify data stored in one or more blocks in the flash memory storage device where, as part of the wear leveling process, old data was transferred from the one or more blocks without new data being transferred to the one or more blocks, and execute one or more actions for data removal in the identified one or more blocks.

17. The system of claim 16, wherein the one or more actions for data removal are executed at predetermined periods of time.

18. The system of claim 16, wherein the one or more actions for data removal are executed during idle cycles of the flash memory storage device.

19. The system of claim 16, wherein the one or more actions includes overwriting data in the identified one or more blocks with indecipherable data.

20. The system of claim 19, wherein the one or more actions for data removal are executed upon receipt of a command input by a user of the computing system as received by a receiver of the host controller.

\* \* \* \* \*